United States Patent [19]

Blaäss

[11] 4,264,959
[45] Apr. 28, 1981

[54] TESTING PROCEDURE AND CIRCUIT FOR THE DETERMINATION OF FREQUENCY DISTORTIONS AND GROUP DELAY TIME DISTORTION OF A TEST OBJECT

[75] Inventor: Gerhard Blaäss, Munich, Fed. Rep. of Germany

[73] Assignee: Siemens Aktiengesellschaft, Berlin & Munich, Fed. Rep. of Germany

[21] Appl. No.: 910,769

[22] Filed: May 30, 1978

[30] Foreign Application Priority Data

Jun. 2, 1977 [DE] Fed. Rep. of Germany ....... 2724991

[51] Int. Cl.³ .................... G01R 27/28; H04B 3/46
[52] U.S. Cl. ................... 364/487; 364/485; 364/718; 364/726; 324/57 DE; 455/67; 179/175.3 R
[58] Field of Search ............. 364/484–487, 364/553, 576, 580, 726, 827, 721, 718; 324/57 DE, 77 A, 77 B, 77 R; 307/237; 325/42, 67, 65; 343/17.7, 5 FT, 17.2 R; 35/10.4; 328/14, 16, 17; 179/175.3 R; 455/67

[56] References Cited

U.S. PATENT DOCUMENTS

| | | | |
|---|---|---|---|
| 3,634,688 | 1/1972 | Di Rocco | 324/77 A |
| 3,715,715 | 2/1973 | Ruehle | 364/485 |
| 3,727,037 | 4/1973 | Zorn | 364/721 |
| 3,770,984 | 11/1973 | Connor et al. | 307/237 |
| 3,777,256 | 12/1973 | Harrison | 179/175.3 R |
| 3,831,015 | 8/1974 | Hoff, Jr. | 364/718 |
| 3,846,593 | 11/1974 | Bradley | 179/175.3 R |
| 3,876,946 | 4/1975 | La Clair et al. | 364/485 |
| 3,881,097 | 4/1975 | Lehmann et al. | 364/485 |
| 3,952,189 | 4/1976 | Fabricius | 328/14 |
| 3,973,112 | 8/1976 | Sloane | 364/553 |
| 4,067,060 | 1/1978 | Poussart et al. | 364/553 |
| 4,093,988 | 6/1978 | Scott | 364/484 |
| 4,093,989 | 6/1978 | Flink et al. | 364/485 |

OTHER PUBLICATIONS

"Transfer Function Measurement Using Fast Pulses" by R. C. French, Published in Electronic Engineering, Aug., 1966, pp. 516-519.

"Measuring Waveform Distortion with a Par Meter" By W. T. Cochran, Published in Bell Lab Record, Oct., 1965, pp. 369-371.

CCITT Recommendation, Recommendation 0.81, vol., IV. 2, pp. 44-50.

Primary Examiner—Charles E. Atkinson
Assistant Examiner—Gary Chin
Attorney, Agent, or Firm—Hill, Van Santen, Steadman, Chiara & Simpson

[57] ABSTRACT

In testing to determine frequency distortions and group delay time distortions of a test object in a telecommunication link, a test pulse is introduced and its distortion caused by the test object is evaluated, which determination is specifically indicated in that the test pulse consist of a number of preselected oscillations, with respect to amplitude and phase of different frequencies, and that the return pulse is processed with the help of Fourier analysis and the individual frequency components are analyzed with respect to amplitude and phase relationship with respect to each other.

19 Claims, 6 Drawing Figures

TESTING PROCEDURE AND CIRCUIT FOR THE DETERMINATION OF FREQUENCY DISTORTIONS AND GROUP DELAY TIME DISTORTION OF A TEST OBJECT

BACKGROUND OF THE INVENTION

1. Field of the Invention

The present invention relates to a testing procedure for determining frequency distortions and group delay time distortions of a test object, for example, a telecommunication link which is fed with a test pulse and where the deformation caused by the test object is evaluated.

2. Description of the Prior Art

In existing procedures, the group delay time of a test object is determined by using a procedure, named after Nyquist, by determining the phase displacement of the envelope of a modulated sinusoidal carrier which also produces frequency distortion information. This procedure will result in accurate test levels; it is however rather time consuming and complicated to perform a test.

For simplified pass/reject decisions with respect to group delay time and frequency distortion measurements in the low frequency voice communication band, it is also known to use a so-called PAR process, in which a pulse sequency is manually introduced to a transmission link and an attempt is made to draw conclusions with regard to the quality of the transmission line by measuring the pulse degradation by determining the ratio between peak and average values. Several influence quantities, however, effect the test results, which differently influence the various types of modulations in data transfer. This restricts the potential value of this simple process.

SUMMARY OF THE INVENTION

It is therefore the object of the present invention to provide a process and a circuit arrangement which can be used to obtain quick, simple and sufficiently accurate information with respect to the frequency dependent damping effects and the group delay times, particularly in telecommunication links.

In order to achieve the aforementioned objective, according to the present invention, a test pulse is formed which consist of a series of oscillations of predetermined amplitude and phase and differing frequencies and the return pulse is analyzed by Fourier analysis into its individual frequency components with respect to amplitude and phase.

In particular, a test pulse is formed in accordance with the following relationship:

$$U(t) = \sum_{n=1}^{n=x} A_n \cdot \cos(2\pi \cdot n \cdot f \cdot t + \phi_n)$$

where $\phi_n$ = the phase of the transmitted pulse.

With this arrangement, one may obtain, by simple means, sufficient accurate information with respect to the frequency dependent damping and group delay times, particularly at the band limits.

The circuit arrangement for the execution of this process is formed in such a way as to introduce the test pulse after passing through the transmission link under test to an analyzer, with a time sequence of a return pulse is determined and the results, for example, are digitized by means of an analog/digital converter and are stored in a memory, that the stored information of the return pulse is analyzed by means of a calculator with respect to its frequency components and its real and imaginary parts, respectively, and the phase of each component, and the results obtained are compared with the original values and, that by means of this information, through the use of a calculator, the values for frequency distortion and group delay time are determined.

It is preferred that the test pulse is first conditioned by a pre-amplifier and a filter, which has the additional advantage that the line losses are equalized and noise outside of the bandwidth is eliminated.

The change in amplitude and group delay time can either be displayed in point form by means of a television screen or a television storage disc, or could be tabulated by means of a printer.

It is furthermore possible to analyze the test results if they satisfy a predetermined permissible variation and, depending on the results, satisfied or unsatisfied, compared to the entered data, will make an accept/reject decision.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
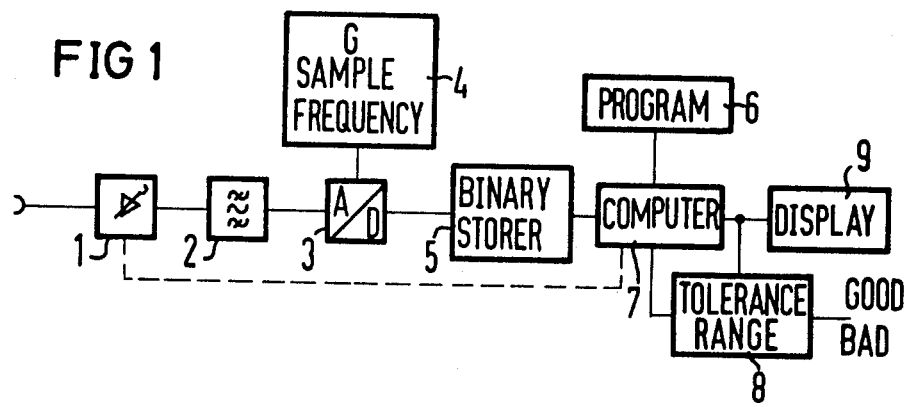
FIG. 1 is a schematic representation of apparatus for receiving an analyzing a predetermined test pulse, of the type set forth above.

Referring to FIG. 1, a test pulse, which consists of superimposed individual harmonics of known amplitude and phase is introduced to the test object, for example a transmission link. The individual amplitudes of the harmonics are damped differently when passing the test object, depending on the damping characteristics, with respect to frequency, and the phase relationship of the group delay time is also altered with respect to frequency. The return pulse of the particular test object, accordingly, has a modified time sequence. In addition, noise can be superimposed on the test pulse.

Noise voltages which occur outside of the bandwidth under test can be suppressed by a suitable filter, here a band pass filter 2, which is connected to the output of a pre-amplifier 1, which pre-amplifier has an amplification factor which can be directly factored into the result. In the following stage, the time sequence of the return pulse is written into a memory 5 by scanning several values (at least two values for the highest frequency encountered) with a scanner 4 which operates an analog/digital converter 3. This sensing and storing procedure can be performed over several pulse periods in order to increase the signal-to-noise ratio, depending on the magnitude of the remaining noise level.

It is advantageous to scan one cycle and run through the program. At a later point in time, again new cycles in phase can be scanned and used in the program. Following each evaluation, the mean of the results up to this point is calculated and presented. One can see very well in this process and in a representation fed to a television screen how the final curves are formed. However, also an on-line processing of the values can be envisioned, considering an equivalent effort in the following calculator 7.

The stored values of the time function are transformed by means of a calculator 7, for example also with the help of a microprocessor, and a FFT program 6 into the frequency plane. As the result of each harmonic, the real and imaginary components are determined and from these components the amplitude and phase are determined. Determining the magnitude of the test value is the change obtained with respect to the conditions of the initial pulse. From these results, in turn, by means of the calculator 7, it is possible to calculate the group delay time $\tau_g(\omega)$ out of the values of the phase angle b and $\omega = 2\pi f$ by $$\tau_g(\omega) = \frac{db(\omega)}{d\omega}$$

that is of interest, whereby if sufficiently high numbers of harmonics are tested in the frequency band in question, the following simplified expression gives an approximation:

$$\tau_g(\omega) \approx \frac{\Delta b(\omega)}{\Delta \omega}$$

The resulting values for amplitude change and group delay time can be presented, for example, by way of a television screen or an xy plotter, or can be printed out by a printer terminal in the form of a table. However, it is also possible to introduce these values to an adjustable permissible variation comparator 8 and to obtain an accept/reject decision if the predetermined set values in the comparator 8 are satisfied or unsatisfied. By suitable changes in the permissible variation computer 8 the accept/reject decision can be narrowed down to a selectable frequency range.

The test pulse can be formed, for example, by superimposing several different harmonic cosine oscillations in accordance with the equation $$U(t) = \sum_{n=1}^{n=16} A \cos(2\pi \cdot n \cdot f \cdot t),$$

where A = constant, and
f = 200 Hz.

This composition is particularly valid in the evaluation of long distance telephone lines. Due to the constant amplitude of relatively all harmonics, changes, particularly at the band limits, are strong contributors to the pulse distortions as compared to, for example, a manually introduced cosine oscillation as used, for example, in the PAR procedure. The generation of such a particular test pulse is relatively simple if the values, as stored in the memory, are successively called off and then converted from digital values to analog values.

The present explained testing procedure for the determination of frequency distortions and group time delay distortions makes use of the transformation of the time plane into the frequency plane. This transformation is, in itself, defined by Fourier and any process which realizes this transformation can be used.

Figure 2:
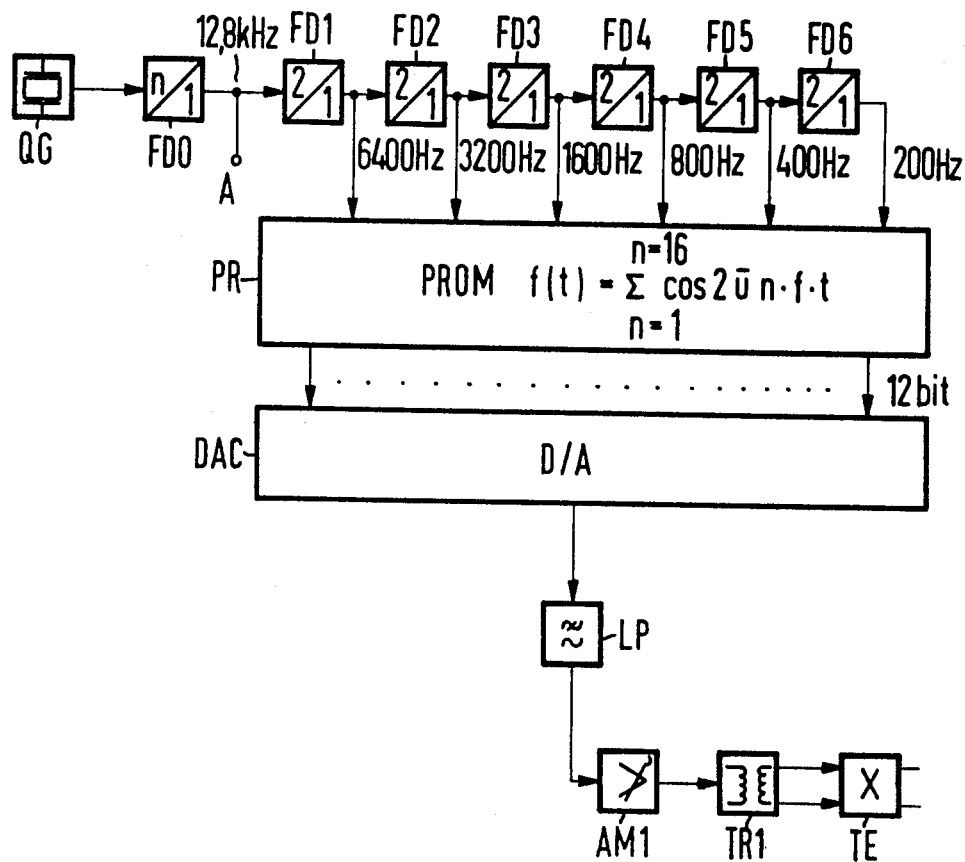
FIG. 2 is a schematic representation of apparatus for producing the test pulse from a series of harmonic oscillations.

Referring to FIG. 2, a circuit arrangement is illustrated for producing a test pulse from a series of harmonic oscillations. This example relates to measurements of a telephone channel (bandwidths of 300 Hz–3 kHz). For creating the test pulse, a crystal oscillator QG has a first frequency divider FDO connected to the output thereof and having a division ratio of n:1. A rectangular-shaped voltage sequence having a frequency of 12.8 kHz, for example, is present at the output of the frequency divider FDO. This rectangular voltage sequence is fed to a line of six frequency dividers FD1–FD6 which are connected in series and, respectively, have dividing ratios of 2:1.

With the above divisions, $2^6 = 64$ different combinations can be consecutively produced on the six output lines with the aid of the six-stage binary divider FD1–FD6, in this example at frequencies of 6400 Hz, 3200 Hz, 1600 Hz, 800 Hz, 400 Hz and 200 Hz. The output lines are connected to a programmable storage unit (PROM), here simply referenced PR, as address lines. With each of the $2^6 = 64$ addresses, a storage word is addressed in the programmable read only memory PR and connected to the output of the programmable read only memory as, for example, a 12-bit word which contains the digitalized instantaneous value of the undistorted time function.

Figure 4:
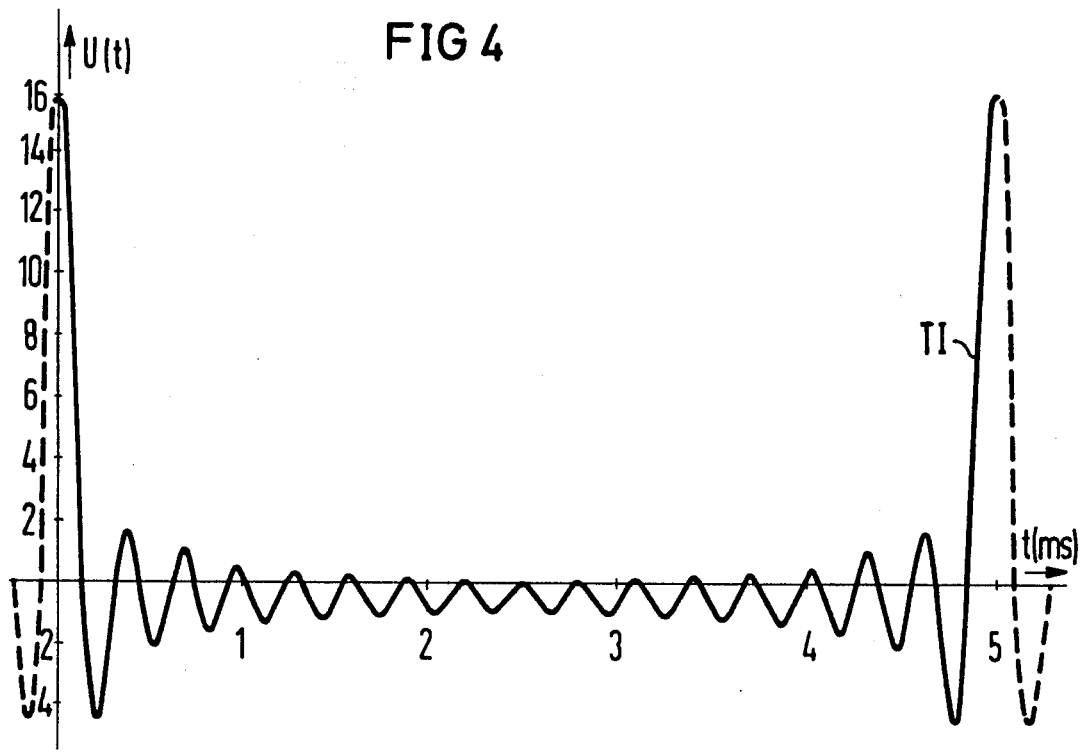
FIG. 4 is a graphic illustration of the course of a test pulse, with respect to time for a test pulse which is produced in accordance with the circuit of FIG. 2 and which is present at the output of the low pass filter or the adjustment circuit, respectively.

These digitalized instantaneous values are consecutively converted into analog voltage values by means of a stepping of the addresses of the programmable read only memory PR at 12.8 kHz in a digital/analog converter DAC connected to the memory PR. The time function is formed as a stepped curve at the output of the digital/analog converter DAC, which time function repeats periodically at the base frequency of 12.8 kHz/64 = 200 Hz in this particular example. In a subsequent low pass filter LP, the step curve is converted into a continuous function so that, for example, a function of $$U(t) = \sum_{n=1}^{n=16} \cos(2\pi \cdot n \cdot f \cdot t)$$

with f = 200 Hz
is formed (see FIG. 4). Should any kind of adulterations of the time function occur, for example by attenuation pulsation factors in the pass region, or by a phase displacement, in the low pass filter LP, the adulterations can be compensated by a preliminary correction in the programmable read only memory PR. The continuous voltage function set forth above forms the test pulse which reaches an adaptor circuit TR1 in the form of a line transformer, for example, by way of an adjustable amplifier AM1, and from the transformer TR1 the same is applied to a measuring object TE, preferably a transmission path, whose group transit time and/or attenuation adulteration is to be measured.

Figure 3:
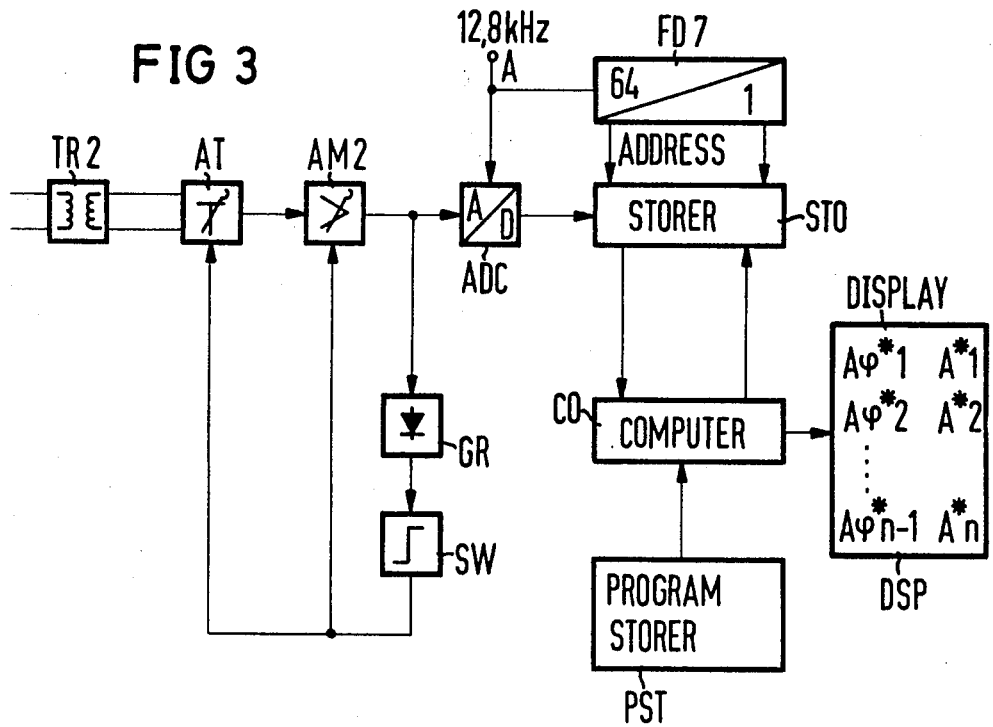
FIG. 3 is a schematic representation of a circuit for evaluating the test pulses.

FIG. 3 illustrates a circuit for evaluating the test pulses altered by the group delay time and by attenuation adulteration of the object of measurement. From the object of measurement TE the distorted test pulse first reaches a translator TR2, for example a transformer, which has an attenuation circuit AT (attenuation pad) connected to its output by way of which the test pulse is fed to an adjustable amplifier AM2. From the adjustable amplifier AM2, a regulating loop branches off which is fed by way of a rectifier GR and a switching circuit SW, which regulating loop influences the amplification of the amplifier AM2 such that a maximum amplitude of the received test pulse, within certain narrow tolerance limitations, is present. An analog/digital converter ADC is connected to the output of the amplifier AM2 to digitalize the instantaneous values of the received test pulse, under the control of a pulse frequency of 12.8 kHz. These 12.8 kHz signals are branched off from the output of the first frequency converter FDO in FIG. 2 at the terminal A.

The 12.8 kHz pulses, moreover, are fed to an additional frequency divider FD7 which has a division ratio of, for example, 64:1. This frequency divider FD7 has the same construction as the dividers FD1–FD6 in FIG. 2, and can be identical with these dividers to form, for example, the addresses on its six output lines to obtain binary values of the signals which are consecutively supplied by the analog/digital converter ADC to correspond with the respective instantaneous values of the components of the test pulse, which values are stored in a memory STO. After once passing the divider FD7, i.e. after the storing of, for example, 64 instantaneous values of the received test pulse, the process is completed. Precisely one period of the test pulse is stored with the 64 values in digitalized form.

The memory STO cooperates with the computer CO in dialog (two-way) traffic subsequent to value storage, whereby first of all the stored values are computed in accordance with a fast-Fourier program (FFT program). The program is contained in a program memory PST. An example of such a FFT program for computing the fast Fourier transform is described in the book "The Fast Fourier Transform" by G. Oran Brigham, at Pages 163–171.

The transit from the time range into the frequency range is carried out with this FFT computer process. The result for each of the $n = 16$ harmonics, for example, is the real portion $(R_n^*)$ and the imaginary portion $(I_n^*)$. For each harmonic the amount of the amplitude $A_n^*$ is subsequently computed from the real and imaginary portions with the equation $$A\eta^* = \sqrt{R\eta^{*2} + I\eta^{*2}}$$

and also the phase $\phi_n^*$ may be computed in accordance with the equation $$\phi_n^* = \arc \text{tg}(I_n^*/R_n^*).$$

The programs required for these computations are also contained in the program memory PST.

If the object of measurement TE had, for example, a frequency-dependent attenuation, the individual amplitudes $A_1^* \ldots A_n^*$ of the harmonic, computed at the response side, is no longer identical with the individual amplitudes of which the emitted test pulse was composed (refer to the first equation). The amplitude change by the object of measurement is computed for each harmonic and the result is illustrated on a suitable display device, here referenced DSP. The required program is also contained in the program memory PST.

The individual harmonics of the transmitted test pulse, moreover, had no phase displacement (again refer to the first equation). If the object of measurement TE, for example a transmission link, exhibits a frequency-dependent phase displacement, the difference of the phases of the two adjacent harmonics of the received test pulse is $$\Delta\phi_{n-1}^* = \phi_n^* = \phi_{n-1}^*$$

a measurement for the group delay time $\tau g$ in that, as noted above, $$\tau g = d\phi^*/d\omega \approx \Delta\phi_n^*/\Delta\omega$$

where in this example $$\Delta\omega = 2\pi \cdot 200 \text{ Hz} = \text{constant}.$$

This result is also computed in accordance with a program in the program memory PST and is illustrated with the display device DSP. Therefore, the total information concerning the attenuation adulteration and concerning the group delay time distortion of the transmission path is displayed.

Referring to FIG. 4, a test pulse TI, which is produced in accordance with FIG. 2 and which is present at the output of the low pass filter LP or the adjustment circuit TR1, respectively, is plotted, with respect to time, for one period. The test pulse TI consists of $n = 16$ different harmonics of the base frequency 200 Hz. The harmonics extend from 200 Hz where $n = 1$ through 3200 Hz where $n = 16$. For simplification it is assumed that the amplitudes of all the individual harmonics are respectively selected the same and that the initial phase $\phi_n$ is zero (here refer to the first equation).

Figure 5:
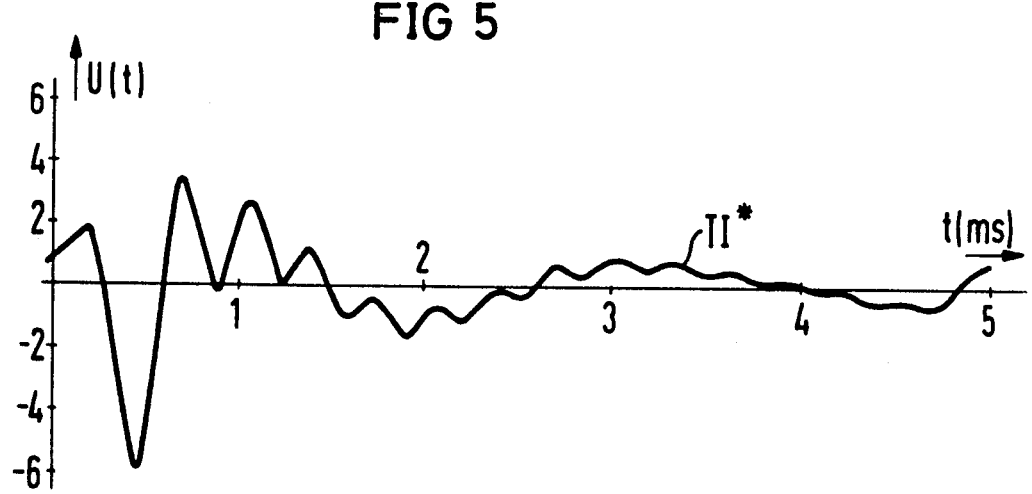
FIG. 5 is a graphic illustration of a test pulse, with respect to time, for a transmission path which is greatly distorting, with respect to attenuation and with respect to group delay time.

FIG. 5 illustrates the test pulse, now referenced TI*, which is greatly distorted with respect to attenuation and with respect to group transit time, the pulse having traversed the transmission path X (TE) and being plotted with respect to time. It has been assumed that the pulse TI* is the pulse TI of FIG. 4 which was input to the transmission path. From FIG. 5 it is evident that the chronological course of the voltage U(t) has been substantially altered. This alteration not only contains the amplitude distortion (attenuation distortion) but also the phase distortion. It is the task of the computer CO of FIG. 3 to determine the phases and phase differences $\Delta\phi_1^*, \Delta\phi_2^* \ldots \Delta\phi_{15}^*$ and the appertaining amplitude values $A_1^* \ldots A_{16}^*$ for the individual, for example, $n = 16$ different frequencies. From these values the group transit time and the attenuation distortion can be read.

Figure 6:
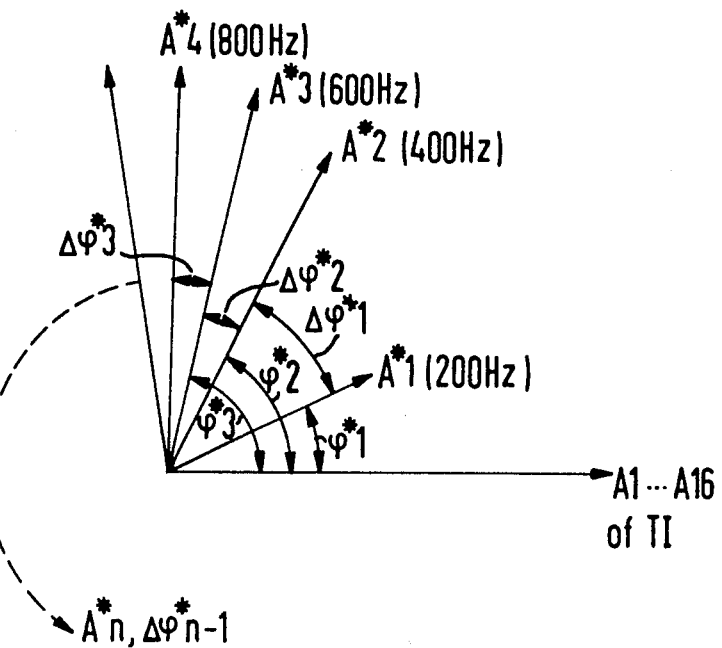
FIG. 6 is a vector diagram illustrating the relations for certain values obtained at the output of the circuit of FIG. 3.

FIG. 6 is a vector diagram which illustrates the relationships of the values $\Delta\phi_1^* \ldots \Delta\phi_{n-1}^*$ and $A_1^* \ldots A_n^*$ obtained at the output of the circuit illustrated in FIG. 3. Transmitted test pulse TI is illustrated as a thick line the superimposed amplitudes $A1 \ldots An$ and is referenced TI in FIG. 6. A sequence of individual oscillations results from the test pulse TI due to the phase distortion and amplitude distortion of the test path, the individual oscillations being displaced in phase relation to one another and exhibiting different amplitudes. FIG. 6 illustrates the first of these amplitude values and phase values and the vector $A_1^*$ (for the frequency of $f_1 = 200$ Hz), the vector A$_2$* (for the frequency of 400 Hz), the vector A$_3$* (for the frequency of 600 Hz), etc. Between the vector A$_1$* and the vector A$_2$*, a phase displacement $\Delta\phi_1$* exists which is illustrated on the display device DSP in accordance with FIG. 3 and which reproduces the phase displacement as a measurement of the group transit time in the range of between 200 Hz and 400 Hz. The phase difference $\Delta\phi_2$* displays the group transit time between 400 Hz and 600 Hz in the same manner. Therefore, the complete vector diagram in accordance with FIG. 6 illustrates the total result at the output of the computer CO of FIG. 3.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. Apparatus for determining frequency distortions and group delay time distortions of a transmission medium which carries a test pulse composed of a preselected number of oscillations of different frequencies having predetermined amplitudes and phase relationships, comprising:
   receiving means for receiving the test pulse;
   scanning means including an analog/digital converter connected to said receiving means and a scanner connected to said converter for causing said converter to convert the test pulse components into digital data;
   a memory connected to said analog/digital converter for storing the digital data; and
   analysis means connected to said memory for dividing the test pulse digital data components into the real and imaginary parts and determining the magnitude and phase of each component including comparison means for comparing the test magnitude and phase data with the original magnitude and phase data to determine damping and group delay time.

2. The apparatus of claim 1, wherein said receiving means comprises:
   a preamplifier; and
   a filter connecting said preamplifier to said analog/digital converter.

3. The apparatus of claim 1, wherein said analysis means comprises a computer programmed to analyze the digital data provided by said analog/digital converter.

4. The apparatus of claim 1, and further comprising:
   display means connected to said analysis means for displaying determined amplitude changes and group delay time.

5. The apparatus of claim 1, and further comprising:
   a printer connected to said analysis means for printing the determined amplitude changes and group delay time.

6. The apparatus of claim 1, and further comprising:
   a comparator connected to said analysis means and having acceptable values set therein and operable in response to the test magnitude and phase data to provide an accept/reject decision.

7. The apparatus of claim 1, wherein said scanning means comprises:
   a frequency divider having an input for receiving a clock pulse and a plurality of outputs connected to and defining storage addresses for said memory,
   said analog/digital converter also including a clock input connected in common with said input of said frequency divider.

8. The apparatus of claim 1, wherein said receiving means comprises:
   an adjustable attenuator connected to said transmission medium;
   an adjustable amplifier connected between said adjustable attenuator and said analog/digital converter, including a control input; and
   a feedback regulating circuit connected between the output and said control input of said adjustable amplifier for regulating the output of said amplifier to the maximum amplitude of the received test pulse.

9. The apparatus of claim 8, wherein said regulating circuit comprises:
   a rectifier connected to the output of said amplifier; and
   a threshold switch connected between said rectifier and said control input of said amplifier.

10. The apparatus of claim 1, further comprising, in combination therewith, means for producing the test pulse, comprising:
    clock means for producing clock pulses at a first predetermined frequency;
    a plurality of frequency dividers connected in series with said clock means and operated to divide said first predetermined frequency into a plurality of clock pulses at lesser predetermined frequencies; and
    conversion means for converting said pulses at said first and lesser predetermined frequencies into said test pulse.

11. The apparatus of claim 1, wherein said conversion means comprises:
    a programmable memory storing digital information relating to pulse amplitudes and phase relationships, said clock pulses defining the addresses of and reading the digital information from said memory as multi-bit data words; and
    a digital/analog converter connected to said memory for converting said multi-bit data words into analog signals forming said test pulse.

12. The apparatus of claim 11, further comprising:
    means connecting said digital/analog converter to said transmission medium, including a low pass filter and an adjustable amplifier.

13. A process for determining frequency distortions and group delay time distortions of a communications link, as a test object, comprising the steps of:
    generating a test pulse having a preselected number of oscillations of different frequencies, predetermined amplitudes and phase relationships, in accordance with the expression $$U(t) = \sum_{n=1}^{n=x} A_n \cos(2\pi \cdot n \cdot f \cdot t + \phi_n)$$

where n is the number of different oscillations, A$_n$ is a constant, and $\phi_n$ is the phase relationship of the different oscillations;
applying the test pulse to the communications link;

receiving the test pulse, including distortions thereof, from the communications link;
performing a Fourier analysis of the received pulse; and
analyzing the resultant Fourier components with respect to amplitude and phase relationships.

14. The method of claim 13, comprising the steps of:
sampling the received test pulse to obtain two values for the highest occurring frequency; and
storing the two values in a memory.

15. The method of claim 14, comprising the step of:
converting the two values in an analog/digital converter prior to storage in the memory.

16. The method of claim 15, comprising the step of:
sampling one period of the test pulse and performing the Fourier analysis.

17. The method according to claim 16, comprising the steps of:
sampling and storing over a plurality of test pulse periods;
performing the Fourier analysis for each period; and
forming and displaying the mean value of the preceding results after each Fourier analysis.

18. The method of claim 17, comprising the step of:
transforming the stored values of the time function of the test pulse into the frequency plane with the assistance of a computer.

19. The method of claim 18, wherein the step of generating is further defined as:
successively sampling values stored in a memory; and
converting the sampled values with a digital/analog converter.

* * * * *